(12) United States Patent (10) Patent No.: US 8,672,578 B2
Blocken et al. (45) Date of Patent: Mar. 18, 2014

(54) LUMINESCENT PAVING STONE IN THE FORM OF AN ARTIFICIAL STONE OR NATURAL STONE

(76) Inventors: Wilfried Blocken, Schalkhoven (BE); Danny Windmolders, Schulen (NL)

( * ) Notice: Subject to any disclaimer, the term of this patent is extended or adjusted under 35 U.S.C. 154(b) by 0 days.

(21) Appl. No.: 13/382,412

(22) PCT Filed: Jul. 5, 2010

(86) PCT No.: PCT/EP2010/059563
§ 371 (c)(1), (2), (4) Date: Jan. 6, 2012

(87) PCT Pub. No.: WO2011/003866
PCT Pub. Date: Jan. 13, 2011

(65) Prior Publication Data
US 2012/0114415 A1 May 10, 2012

(30) Foreign Application Priority Data
Jul. 6, 2009 (DE) .......................... 10 2009 027 489

(51) Int. Cl.
*E01F 9/00* (2006.01)
(52) U.S. Cl.
USPC ................... 404/22; 404/17; 404/23; 404/24; 404/34; 404/36; 362/153.1
(58) Field of Classification Search
CPC ....................................................... E04B 5/46
USPC .......... 404/22, 34–36, 12–16; 362/153, 153.1
See application file for complete search history.

(56) References Cited

U.S. PATENT DOCUMENTS

| 2,198,450 | A | * | 4/1940 | Chertkof ......................... 52/200 |
| 4,570,207 | A | * | 2/1986 | Takahashi et al. ......... 362/153.1 |
| 5,683,170 | A | | 11/1997 | Blaha |
| 5,984,570 | A | * | 11/1999 | Parashar ......................... 404/14 |
| 6,027,280 | A | * | 2/2000 | Conners et al. ................. 404/19 |
| 6,062,766 | A | * | 5/2000 | Fleury et al. ................... 404/11 |
| 6,082,886 | A | * | 7/2000 | Stanford ....................... 362/576 |

(Continued)

FOREIGN PATENT DOCUMENTS

DE 29714074 U1 1/1999
DE 10220491 A1 11/2003

(Continued)

OTHER PUBLICATIONS

International Search Report PCT/EP2010/059563; Jan. 27, 2011.

*Primary Examiner* — Raymond W Addie
(74) *Attorney, Agent, or Firm* — Cantor Colburn LLP

(57) ABSTRACT

The invention relates to a luminescent paving stone in the form of an artificial stone or a natural stone, having at least one self-sufficient luminescent element (22) and a stone body (20). The stone body (20) comprises at least one recess (24) extending from a top side (54) to a bottom side (56) and designed for receiving a luminescent element (22). The luminescent element (22) receives electrical components (36), in particular a photovoltaic cell (38), a charge store (40), a control device (42), and a luminous element (44), and has a length no greater than the depth of the recess (24). The recess (24) has a perforated wall, and a peripheral gap (58) is formed between the perforated wall and the side wall, in which an adhesive mass (26) is present.

6 Claims, 2 Drawing Sheets

(56) References Cited

U.S. PATENT DOCUMENTS

Figure 1:
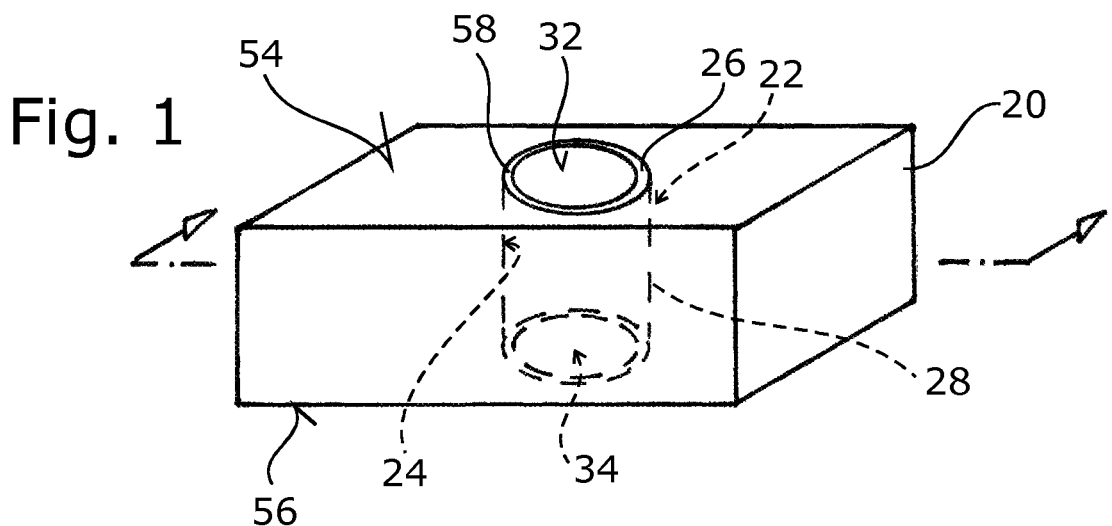

| | | | |
|---|---|---|---|
| 6,339,188 B1 * | 1/2002 | Voelkner | 136/251 |
| 6,354,714 B1 * | 3/2002 | Rhodes | 362/153.1 |
| 6,655,986 B2 * | 12/2003 | Kroll | 439/534 |
| 6,932,489 B2 * | 8/2005 | Sooferian | 362/145 |
| 7,316,519 B2 * | 1/2008 | Ryman et al. | 404/22 |
| 7,556,394 B2 * | 7/2009 | Patti | 362/153.1 |
| 8,002,427 B2 * | 8/2011 | Lavigne | 362/153.1 |
| 8,091,315 B2 * | 1/2012 | Losonczi | 52/596 |
| 8,192,829 B2 * | 6/2012 | Sturley | 428/156 |
| 2004/0184263 A1 | 9/2004 | Patti | |
| 2007/0274089 A1 | 11/2007 | Harris | |
| 2008/0272278 A1 * | 11/2008 | Shewa et al. | 250/206 |
| 2010/0188842 A1 * | 7/2010 | Yohananoff | 362/153.1 |
| 2012/0262911 A1 * | 10/2012 | Schweizer et al. | 362/183 |

FOREIGN PATENT DOCUMENTS

| | | |
|---|---|---|
| DE | 202007010244 U1 | 12/2007 |
| DE | 102006057071 B3 | 4/2008 |
| WO | 02055789 A1 | 7/2002 |

* cited by examiner

LUMINESCENT PAVING STONE IN THE FORM OF AN ARTIFICIAL STONE OR NATURAL STONE

The invention relates to a luminous paving stone in the form of an artificial stone or natural stone comprising a self-sufficient luminous element, the paving stone comprising at least one luminous element and a stone body realized as a stone body of transparent plastic and/or a natural-stone material and/or an artificial-stone material. The invention further relates to a luminous element as it can be used in such a stone, but as it can also be used in other applications. For example, it may be inserted into any bore hole; this bore hole may be located in a wall, at any location of a building, or the like. This luminous element may also be used in various places and not only in a paving stone. Finally the invention also relates to a self-sufficient luminous stone of plastic into which electrical components, in particular a photovoltaic cell, a charge storage device, a control unit and a lighting means are embedded.

There is a demand for luminous bodies that do not require any separate power supply for the lighting of driveways, lighting around swimming pools, lighting of garden paths, the lighting of walls and similar applications. The luminous bodies are supposed to be self-sufficient. They are supposed to absorb sunlight incident during the daytime via a photovoltaic cell and store it in a charge storage device; a control unit controls the charge. In darkness, the control unit activates a lighting means that is supplied with voltage through the charge storage device. The photovoltaic cell may be used as a sensor for darkness; however, a separate light sensor may also be provided.

If such luminous bodies are to be integrated into the paving, for example into the paving of a driveway, it is advisable to prepare a paving stone especially for the lighting function. This has the advantage that the respective paving stone can be brought into the assembly like a normal, regular paving stone. It differs from the other paving stones only by comprising at least one self-sufficient luminous element. It does not differ from the other paving stones with regard to its contact surfaces to these other stones or with regard to the joints. Though it is not as rugged as a regular paving stone, its strength can be enhanced by additional measures, such as reinforcement and/or higher-quality concrete or a corresponding material. Preferably, such luminous paving stones are suitable for the part of paths in which no large amounts of stress due to vehicles occur. Thus, vehicles are supposed not to roll over these paving stones, if possible.

Finally, there is a demand for stones that are completely made from plastic. The plastic envelops all the components of the self-sufficient light, just as in the above-described luminous element, the sole difference being that this stone can now be directly inserted into a pavement, that it thus has the size of a regular paving stone.

The invention is based on the object of proposing a luminous body in the form of a luminous paving stone, luminous stone or a luminous element which can be conveniently inserted into existing structures and can just as conveniently be inserted into new installations, which is permanently embedded and has a secure connection that does not become defective even in the case of large temperature fluctuations, and which can be used in a variety of ways.

This object is achieved with a luminous paving stone according to patent claim 1, with a luminous element according to claim 21, and by a luminous stone according to claim 24.

The invention proposes a standardized luminous element which is produced in few configurations. It has a prismatic shape, in particular a cylindrical shape. In its interior, it contains electrical components, in particular a photovoltaic cell, a charge storage device, a control unit and a lighting means. These electrical components are permanently embedded into a transparent plastic, for example polycarbonate.

Such a luminous element can be inserted into any recess, in particular bore hole, which is placed in a paving stone, be it an artificial or natural stone, or in any other structure, for example in a wall. In this case, the recess has a slightly bigger size than the prismatic body of the luminous element. Thus, an adhesive mass, in particular a silicone material, fits between the luminous element and the recess. On the one hand, this glues the luminous element to the stone; on the other hand, it absorbs all thermal stresses between the two. The luminous element can be accommodated in any paving stone or in any wall in this manner, by realizing the respective recess, in particular bore hole, and inserting the luminous element. No further steps are required.

The luminous paving stone comprises at least one luminous element of the type described herein. It is connected to this luminous element through a layer of adhesive mass, in particular silicone. In this case, a light emitting surface of the luminous element and a top side of the paving stone end flush with each other. If possible, the adhesive mass does not protrude over the surface but is flush therewith.

In a preferred embodiment, the luminous element has a length which is slightly shorter than the depth of the recess. It is thereby avoided that the luminous element protrudes over the recess towards the bottom or towards the rear.

In a preferred embodiment, the luminous element is configured in such a way that its electrical components are substantially in the vicinity of the light emitting surface. Underneath the electrical components, the luminous element is formed only by the plastic material. There, it is possible to cut through the luminous element and shorten it in this manner without clashing with the electrical components. Thus, the luminous element can be adapted to the different thicknesses of stones, walls and the like.

Figure 2:
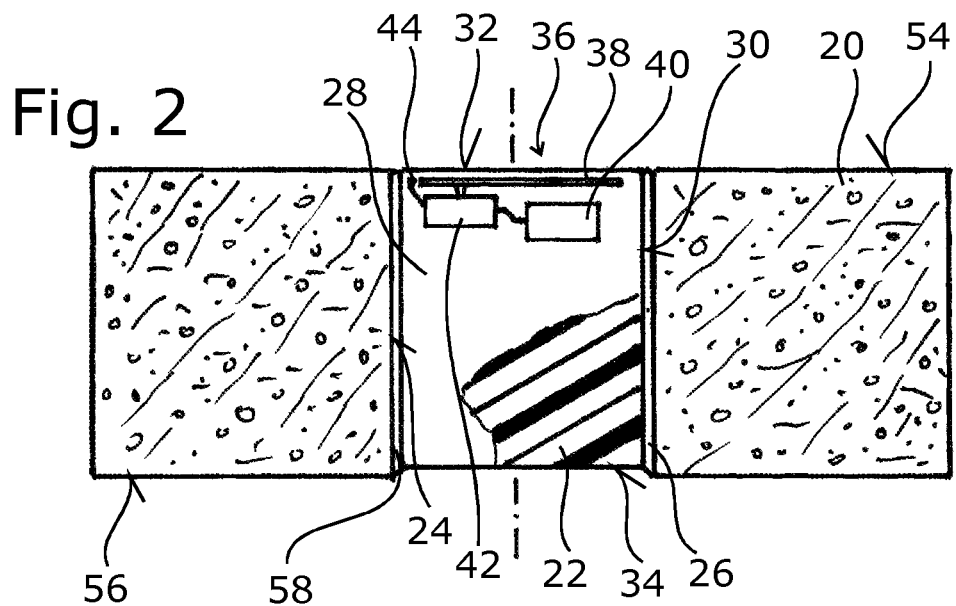
Figure 3:
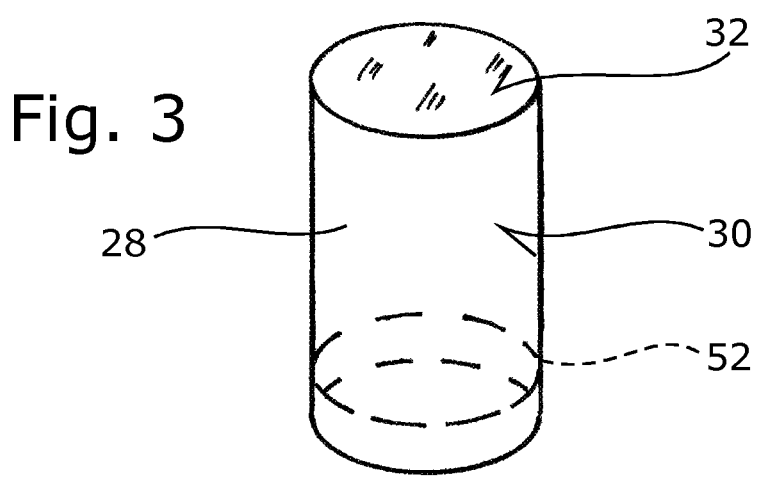
Figure 4:
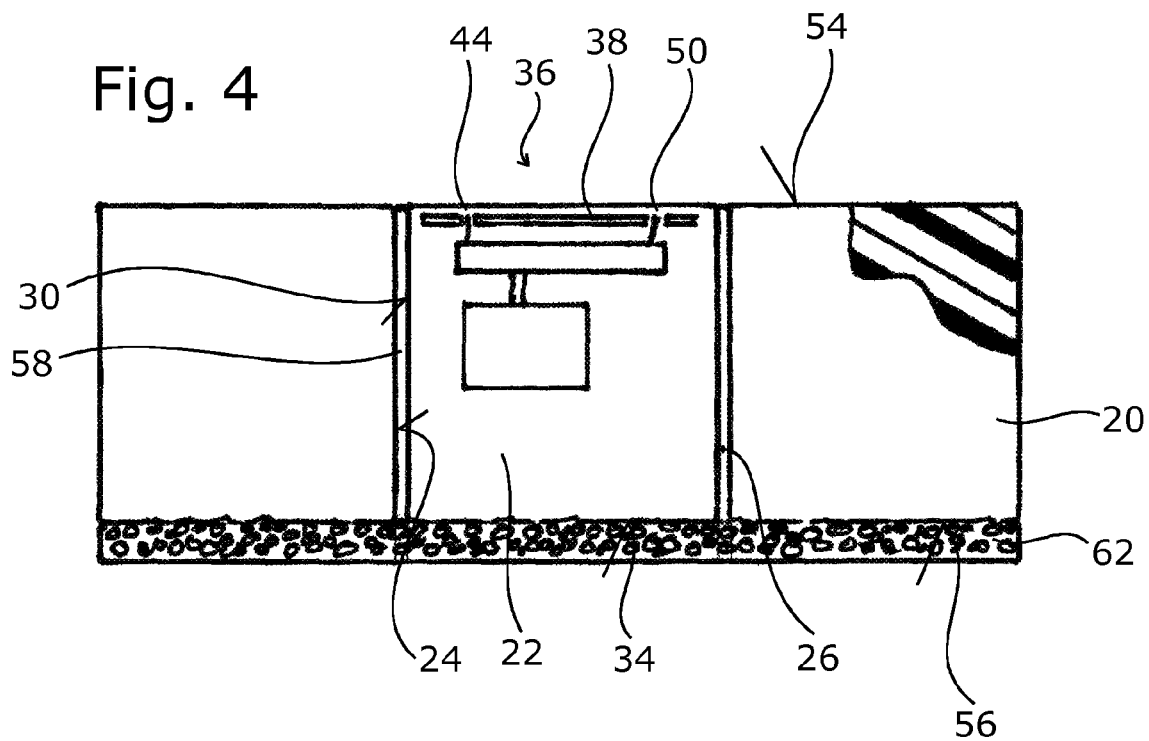
Figure 5:
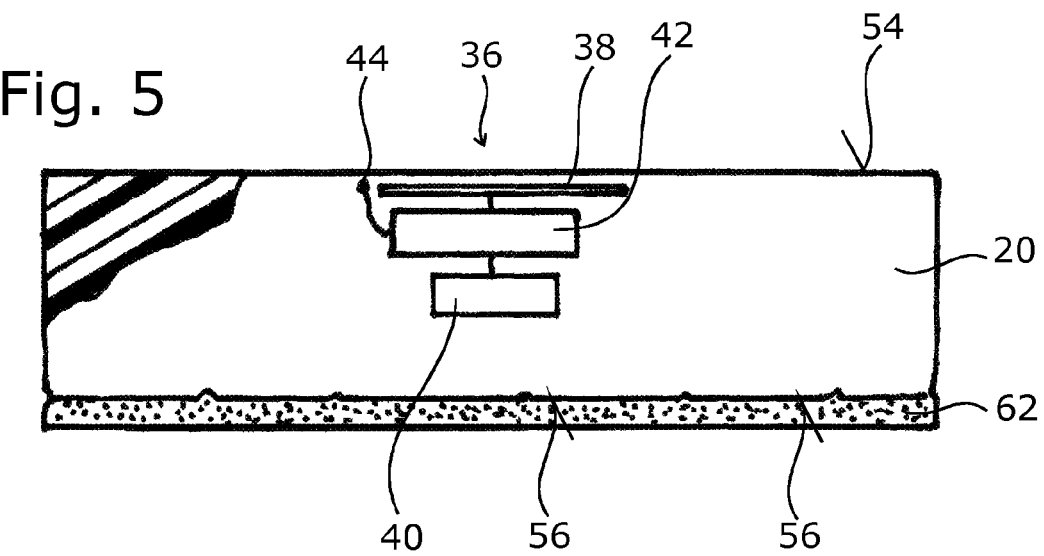

Other advantages and features of the invention become apparent from the other claims as well as from the following description of exemplary embodiments of the invention, which are to be understood not to be limiting and which will be explained in detail below with reference to the drawing. In the drawing:

FIG. 1: shows a perspective view of a luminous paving stone with only one luminous element, FIG. 2: shows a section along the line of cut II-II in FIG. 1, FIG. 3: shows a perspective view of a luminous element as shown in FIGS. 1 and 2, FIG. 4: shows a section similar to FIG. 2 through a second embodiment of the paving stone, and FIG. 5: shows a section similar to FIG. 2 through a third embodiment of the paving stone.

The paving stone has a stone body 20 which is made from the material of a natural stone, for example basalt or marble, and/or from an artificial stone material, in particular concrete, and/or a plastic. The stone body 20 has external dimensions that preferably match the dimensions of a conventional regular paving stone. Thus, the paving stone can be inserted into a group during laying. It can also be subsequently inserted into an already existing surface by removing a regular paving stone and replacing it with a luminous paving stone according to the invention. In this case, the regular stone can also be equipped with a luminous element 22 without removing it from the already existing surface, by placing a recess 24 into the regular stone in situ, and then inserting into the recess 24 an adhesive mass 26, on the one hand, and a luminous element 22 on the other hand.

Moreover, it is not necessary for the paving stone to be laid in a periodic group; it may be laid in any arrangement. A decisive advantage of the invention lies in the fact that a luminous element 22 can also be inserted subsequently into an already existing surface or already existing wall.

If only one luminous element 22 per stone is described and shown in the description, then this does not mean that other luminous elements 22 cannot be accommodated in a stone.

The luminous elements 22 of the first and second configuration are separate construction elements which may and are supposed to be brought on the market also separately. Preferably, the luminous element 22 is provided in only few, standardized configurations, one of which is shown by FIG. 3. The luminous element 22 has a prismatic body 28 limited by a peripheral side wall 30, a light emitting surface 32 and a bottom surface 34. The light emitting surface 32 and the bottom surface 34 have a matching shape, preferably a circular shape; however, a rectangular and square shape are also possible.

In a standardized configuration, the luminous element 22 has a cylinder shape with a diameter of about 93 mm. A drill, in particular a core drill, with a diameter 101 mm is used for the recess 24; those companies that carry out the laying often have such drills anyway.

The body 28 of the luminous element 22 is made from a transparent, in particular glass-clear plastic. In this case, polycarbonate and polyacryl are particularly suitable. The plastic GTS by Voss Chemie is particularly suitable. This is a light-stabilized orthophthalic acid resin for producing cast parts and rigid molded articles. Hardening takes place cold. This is advantageous with regard to the embedded electrical components 36. They are located completely within the body 28. There are no supply lines, contacts or the like guided to the outside. The surface of the body 28 is formed exclusively by the plastic.

The electrical components 36 include in particular a photovoltaic cell 38, a charge storage device 40 preferably configured as a capacitor, a control unit 42 and a lighting means 44. Possible lighting means 44 include LEDs, OLEDs, luminescent plates and the like, in any case lighting means that substantially remain cold during the emission of light.

The control unit 42 is connected to the other components 38, 40, 44. It monitors the state during the daytime and the nighttime. A charging of the charge storage device 40 takes place in the daytime state. As long as a sufficient voltage is supplied by the photovoltaic cell 38, the daytime state is provided. If the voltage supplied by the photovoltaic cell 38 drops below a certain level, the control unit 42 switches over into the nighttime state. The lighting means 44 is now connected to the charge storage device 40; light is emitted. There preferably is an intermediate stage between the nighttime state and the daytime state in which there is neither a charging process, because there is not enough light available for it, nor is light emitted, because it is not yet sufficiently dark.

The photovoltaic cell 38 occupies the largest part of the surface area of the light emitting surface 32. This is at least 70%, preferably at least 80% of the surface area of the light emitting surface 32. The surface area of the lighting means 44 is usually significantly smaller than that of the photovoltaic cell 38, particularly in its configuration as LEDs or OLEDs. They are depicted accordingly in FIGS. 2, 4 and 5. It was found to be particularly convenient to drill small passages 50 into the photovoltaic cell 38 through which the lighting means 44 protrude; see FIG. 4. In this way, the photovoltaic cell 38 is able to occupy virtually the entire available surface area of the light emitting surface 32, in particular more than 90% of it.

Otherwise, the electrical components 36 are part of the prior art; therefore, reference is made to the prior art for further information.

The electrical components 36 are disposed relatively close to the light emitting surface 32. The distance between the light emitting surface 32 and the surface of the photovoltaic cell 38 is as small as possible; it is only a few millimeters, e.g. 1 to 6 mm. The space underneath the photovoltaic cell 38 is used for the control unit 42 and the charge storage device 40. Underneath the electrical components 36, the body 28 does not have any further built-in parts; there, it consists of only plastic. This means that it can be shortened there. FIG. 3 shows a cut 52 in the lower area of the body 28. In this way, it is sufficient to offer only a single length for each individual one of, for example, 3 to 4 configurations or types of the luminous element 22. The user saws off the body 28 to the desired length.

The recess 24 extends from a top side 54 of the stone body to a bottom side 56 of the stone body. The distance from the top side 54 to the bottom side 56 is referred to as the depth of the recess. The recess 24 comprises a perforated wall, which in the exemplary embodiments shown is cylindrical; however, it may also be rectangular or square. It may also have other shapes. However, simple shapes with a high degree of symmetry, in particular the circular shape, are preferred.

The diameter of the recess 24 is slightly bigger than the diameter of the body 28. A free peripheral gap 58 remains if the luminous element 22 is inserted into the recess 24. This peripheral gap 58, independent of the shape, has a thickness of at least 1 mm, at most 10 mm, in particular, the thickness is between 2 and 5 mm. Preferably, the peripheral gap 58 has a constant size everywhere, and deviations from the constant size are less than 20%, in particular less than 10%. The peripheral gap 58 is filled with an adhesive mass 26 that hardens; in particular, silicone is used in this case. Translucent, in particular glass-clear silicones are suitable. The adhesive mass 26 connects the luminous element 22 to the stone body 20. A permanent connection is intended. It is intended that the connection cannot be broken at all, if possible, in any case only using special tools and exerting a lot of effort.

The adhesive mass 26 compensates all thermal expansion differences between the material of the stone body and the plastic material of the body 28.

As FIG. 2 shows, the luminous element 22 is slightly shorter in the axial direction than the depth of the recess 24. The luminous element 22 is supposed not to protrude at the bottom side 56.

The adhesive mass 26 preferably is an elastomer which bonds as permanently and over as much of the surface as possible to the material of the stone body 22 on the one hand, and to the plastic of the body 28 on the other hand. A coupling agent, also called primer, may optionally also be used. Thus, a first coupling agent is applied, if necessary, to the peripheral side wall 30 of the body 28; a second coupling agent is applied to the inner wall of the recess 24. The appropriate adhesive mass 26 is then inserted.

The adhesive mass 26 is preferably filled in by pouring. As regards the process, the paving stone is placed with its top side 54 facing down on a smooth surface, a luminous element 22 is inserted into the recess 24 and then, the pourable adhesive mass 26 is filled in from the top, which is the bottom in the later installation position. This hardens after a certain time, in particular in as short a time as possible.

However, it is also possible to use a rather mushy, pasty material for the adhesive mass 26 and put it into the recess 24, for example with a trowel. Then, the luminous element 22 is pressed into this mass; projecting mass is removed in the area of the light emitting surface 32 before it hardens. In the case of this process, it is convenient if the recess 24 is somehow closed at the bottom side 56. This is the case anyway in paving stones that have already been laid. Most frequently, that is also the case if the recess 24 is placed in a wall. If necessary, the recess 24 can also be closed at the bottom side 56 with suitable means.

A considerable advantage of the invention lies in the fact that the luminous element 22 can be inserted into the recess 24 in any installation position.

It has proved advantageous if the adhesive mass 26 has an optical refractive index greater by at least 0.5, preferably at least 1 than the refractive index of the plastic, that is, for example, the casting resin. In that case, a total reflection is made possible and a lot of light is emitted through the light emitting surface 32.

The adhesive mass 26 preferably has a significantly lower hardness than the hardness of the casting resin of the body 28 and than the hardness of the material of the stone body 20, in particular, that the adhesive mass 26 has a Shore A hardness of less than 90 and more than 25, in particular of less than 80 and more than 30.

The exemplary embodiment for FIG. 4 will now be discussed below. In this case, the stone body 20 consists of a plastic. The plastic material of the body 28 may be used; however, another, for example less expensive plastic may also be used. As in the first exemplary embodiment, a recess 24 is prepared. As in the first exemplary embodiment, a luminous element 22 is inserted into that. Once again, the connection is realized by means of an adhesive mass 26.

The second exemplary embodiment according to FIG. 4 additionally has an underlayer 62. It consists of a ply of material that has a desired, in particular uniform coloring; in particular, the material is white. In particular, the underlayer 62 is formed from small white stones, for example within the band of granulation of 1-3 mm. White powder may also be used, as is the case in the third exemplary embodiment according to FIG. 5. What is important is that the underlayer 62 has a regular structure and color, which does not differ substantially from one luminous paving stone to another luminous paving stone, and which preferably is also not very different to a regular paving stone.

The underlayer 62 has two decisive advantages. On the one hand, it acts as a reflecting means which guides light going down back up again, in particular disperses it. On the other hand, when the stone body 20 is transparent and preferably glass-clear, is forms a defined base surface. Thus, the aesthetic impression given when the paving stone is viewed from above is not determined by random properties of the substructure, but always by the underlayer 62. In the first exemplary embodiment, the stone body 20 is opaque; an underlayer 62 is not used in this exemplary embodiment.

No separate luminous element 22 is used in the third exemplary embodiment according to FIG. 5; rather, the luminous element 22 and the stone body 20 form a unit. Preferably, the plastic that forms the body 28 in the first two exemplary embodiments is used as the material for the stone body 20. No adhesive mass 26 is used in the third exemplary embodiment. Basically, a luminous element 22 is produced which now, however, has the size of an entire paving stone and is not designed anymore to be inserted into a recess 24. An underlayer 62 is provided also in the third exemplary embodiment; it now consists of a fine, powdery white dust. The underlayer 62 may also be designed in the same color that the material of the surrounding paving stones has. Thus, the self-luminous paving stone according to the third exemplary embodiment visually recedes into the background and becomes more similar to the surrounding regular paving stones.

The invention claimed is:

1. A luminous stone in the form of an artificial stone comprising a self-sufficient luminous element, wherein the luminous stone comprises at least one luminous element and a stone body, the luminous element and the stone body form a unit, the stone body comprises a top side and a bottom side, the top side comprises a light emitting surface, the at least one luminous element is embedded in the stone body, the luminous element comprises electrical components including a photovoltaic cell, a charge storage device, a control unit and a lighting means, the stone body is made from a transparent plastic, and an underlayer which is located underneath the bottom side and which is at least partially formed by a homogeneous, white layer of white stones.

2. The luminous stone according to claim 1, wherein the luminous element comprises a translucent casting resin that forms all surfaces of the luminous element and into which the electrical components are embedded.

3. The luminous stone according to claim 1, wherein the electrical components are located in the luminous element at a distance of less than 8 cm from a surface of the luminous element.

4. The luminous stone according to claim 1, wherein at least one standardized configuration of the luminous element has the shape of a cylinder.

5. The luminous stone according to claim 1, wherein the luminous element is provided in at most three different standardized configurations.

6. The luminous stone according to claim 1, wherein the light emitting surface is located at a distance of less than 10 mm from the embedded electrical components.

* * * * *